United States Patent [19]

Todd

[11] 4,205,511
[45] Jun. 3, 1980

[54] SEAL FOR PIVOTABLE FEEDER HOUSING

[75] Inventor: Robert R. Todd, Leola, Pa.

[73] Assignee: Sperry Rand Corporation, New Holland, Pa.

[21] Appl. No.: 8,141

[22] Filed: Jan. 31, 1979

[51] Int. Cl.² .............................................. A01F 12/00
[52] U.S. Cl. ...................................... 56/14.6; 130/27 R
[58] Field of Search ................... 56/14.6, 208, 15.8, 56/15.9; 130/27 R, 27 T

[56] References Cited

U.S. PATENT DOCUMENTS

| | | | |
|---|---|---|---|
| 3,516,530 | 6/1970 | Braet | 56/14.6 |
| 3,648,709 | 3/1972 | DeCoene | 130/27 JT |
| 3,794,047 | 2/1974 | DeCoene | 130/27 T |
| 3,826,350 | 7/1974 | Fowler et al. | 198/82 |
| 3,939,847 | 2/1976 | Straeter | 56/14.6 |
| 3,971,390 | 7/1976 | McDuffie et al. | 130/27 JT |
| 3,973,380 | 8/1976 | Knollman | 56/14.6 |
| 4,075,824 | 2/1978 | Hengen | 56/14.6 |

Primary Examiner—Jay N. Eskovitz
Attorney, Agent, or Firm—John B. Mitchell; Frank A. Seemar; Ralph D'Alessandro

[57] ABSTRACT

The disclosure is directed to a combine with a unique sealing arrangement between the pivotable feeder housing and the inlet opening. The feeder housing includes axially aligned pivot arms which extend away therefrom to engage a pair of support yokes which permit the feeder housing to pivot vertically. The pivot arms include curved contact plates which sealingly engage at least partly semi-circular resilient closure members on the combine frame to prevent crop material from escaping between the feeder housing and the inlet opening.

6 Claims, 4 Drawing Figures

SEAL FOR PIVOTABLE FEEDER HOUSING

BACKGROUND OF THE INVENTION

This invention relates generally to crop harvesting machines commonly known as combines, and specifically to an improved connection between a pivotal feeder housing and the inlet opening of a combine which seals the junction to reduce crop losses.

A combine typically includes a mobile frame containing a threshing and separating mechanism for reducing the crop picked up from the field to a useful and marketable condition. The forward portion of the frame is formed with an inlet opening containing guide means for directing crop material toward the threshing and separating mechanism. A forwardly disposed transverse harvesting header removes the crop from the field, delivers it rearwardly to a feeder housing, or elevator, which in turn delivers the crop material into the inlet opening. The feeder housing is pivotably mounted to the frame to permit vertical movement of the header and fine adjustment for the accommodation of different headers.

Much of the innovative effort in this general technology is directed toward improving the efficiency of the harvesting operation. More specifically, the technically most efficient machines are those which are designed, and improved, to maximize the crop harvest while minimizing the required input in labor and energy. The invention described herein is directed primarily to the maximization of the volume of crop harvested by the reduction of losses in the particularly vulnerable junction area between the pivotable feeder housing and the inlet opening in the frame.

It has been found extremely difficult to construct a pivotable feeder housing extending partly into the inlet opening of a combine which does not permit undesirable grain loss through the vertical interfaces. The solution heretofore used was to attach the feeder housing to the combine frame and then manually select and affix shims to the feeder housing adjacent the inlet opening. While this latter procedure does block a substantial portion of the affected area, it is, nonetheless, not entirely satisfactory. The shimming approach cannot entirely fill the gaps, because to do so would restrict the important pivoting function of the feeder housing.

SUMMARY OF THE INVENTION

It is a feature of the instant invention to provide improved means for reducing grain loss in a combine.

It is another feature of the instant invention to provide means for reducing grain loss between the feeder housing and the inlet opening on a combine.

It is another feature of the instant invention to provide cooperative sealing means on a feeder housing and combine frame which reduces crop loss between the feeder housing and the inlet opening.

It is a further feature of the instant invention to provide a feeder housing with arcuate contact surfaces thereon which engage mating resilient elements on a combine frame to create a seal therebetween.

It is a still further feature of the instant invention to provide cooperative means on a combine frame and a feeder housing which maintain a seal therebetween even during relative vertical pivotal movement of the housing relative to the inlet opening in the combine frame.

These features, and other objects, are attained according to the instant invention by providing a combine with a unique sealing arrangement between the pivotable feeder housing and the inlet opening. The feeder housing includes axially aligned pivot arms which extend away therefrom to engage a pair of support yokes which permit the feeder housing to pivot vertically. The pivot arms include curved contact plates which sealingly engage at least partly semi-circular resilient closure members on the combine frame to prevent crop material from escaping between the feeder housing and the inlet opening.

BRIEF DESCRIPTION OF THE DRAWINGS

For a better understanding of the invention as well as other objects and further features thereof, reference is made to the following detailed disclosure of the preferred embodiment of the invention taken in conjunction with the accompanying drawings thereof wherein.

DESCRIPTION OF THE PREFERRED EMBODIMENT

Figure 1:
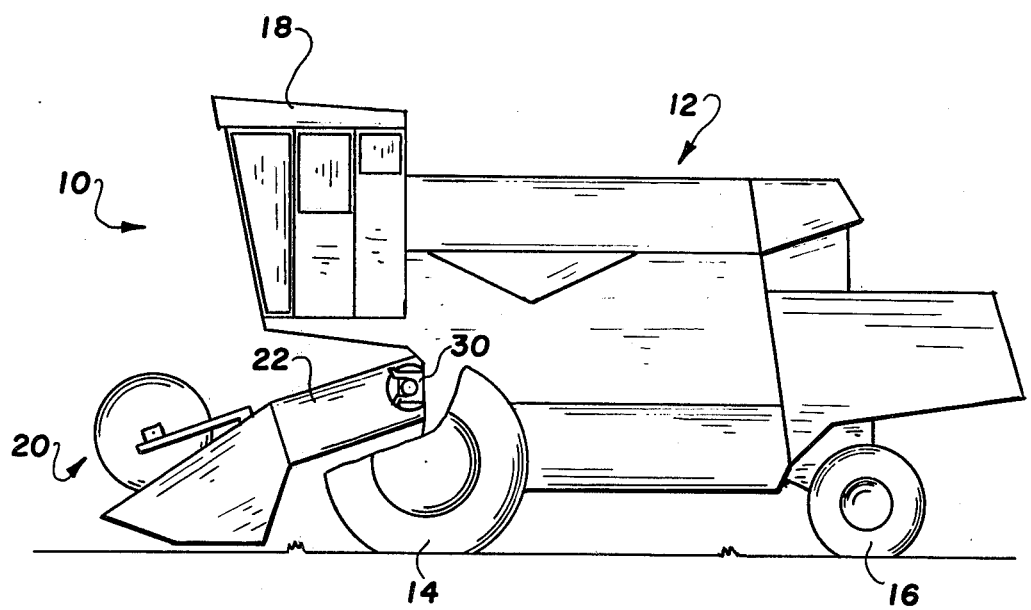
FIG. 1 is a schematic side elevational view of a combine with a feeder housing and header attached thereto.

Referring now to FIG. 1, a combine 10 is schematically illustrated to include a main frame, or body, 12 supported for movement by a pair of front wheels 14 and a pair of rear wheels 16 (only one of each pair being shown). Body 12 encloses the normal working components of a combine such as, for example, an engine, transmission, grain tank, and threshing and separating means. The instant invention, it should be understood, does not relate to or depend upon any specific type of combine, though that shown is of the axial-flow type. The operating controls for the combine 10 are situated in a forward cab 18 which is conveniently located for maximum observation of the transverse crop header 20. A feeder housing 22 is connected between the header 20 and main frame 12 to provide a crop flow channel between the header and the threshing and separating means. The feeder housing 22 is pivotally connected to the main frame 12 by a pair of yokes 30, 32 (see FIG. 2) which permit the forward portion of the housing, and thus the header 20, to move through a vertical arc. Hydraulic cylinders (not shown) are the conventional means by which the feeder housing is raised and lowered.

Figure 2:
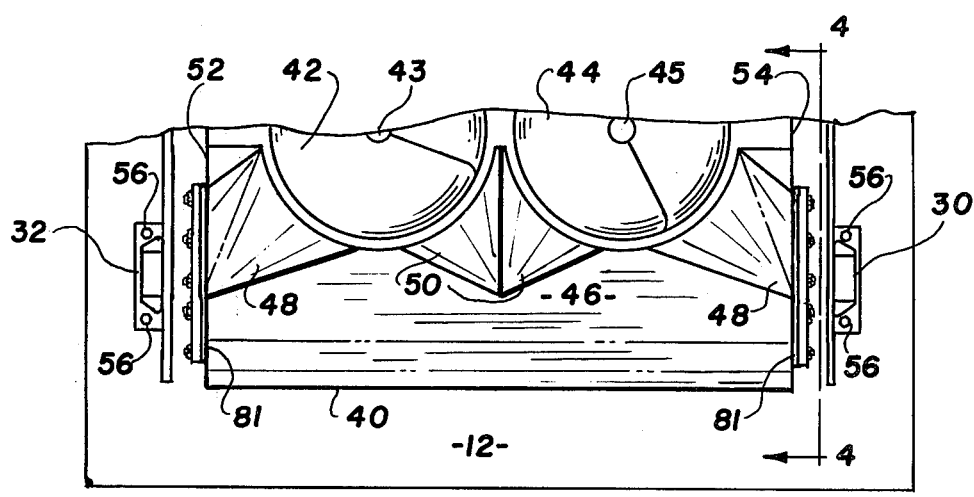
FIG. 2 is a partial schematic frontal view of the inlet opening of the combine of FIG. 1.

Attention is directed briefly to FIG. 2 which is a frontal partial schematic view of the combine showing the generally rectangular inlet opening 40. A pair of axially aligned rotors 42, 44 are rotatably supported, respectively, on shafts 43, 45 and are spaced slightly rearwardly of the plane of inlet opening 40. The rotors 42, 44 comprise part of the threshing and separating means of the axial flow combine shown. Angular guide surfaces 46, 48 and 50 direct the crop material from the feeder housing 22 toward and into the threshing and separating means. It should also be noted here that inlet opening 40 includes a pair of opposing vertical side edges 52, 54. Furthermore, it should be readily apparent that the yokes 30, 32 are affixed to main frame 12 by a series of bolts 56.

Figure 3:
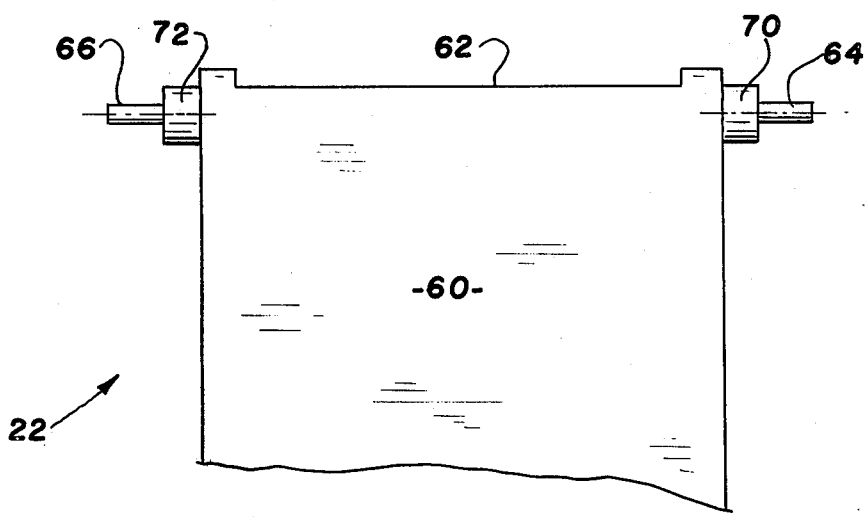
FIG. 3 is a partial schematic bottom plan view of the feeder housing of the combine of FIG. 1.

FIG. 3 is a partial schematic bottom plan view of the rearward portion of feeder housing 22. It can be seen that the housing comprises a main body portion 60 with a rearward opening 62. Feeder housing 22 is, as generally known in the art, substantially a rectangular boxlike structure having opposing sides, a top, a bottom and two opposing ends which are at least partially opened. The internal mechanism, unrelated to the instant invention, usually includes some type of apron assembly which engages and moves the crop material upwardly and rearwardly from the header to the inlet opening of the combine. Body portion 60 further includes a pair of opposing arms 64, 66 which are axially aligned and extend laterally away from the housing adjacent the rearward end thereof. Arms 64 and 66 engage, respectively, yokes 32 and 30 to pivotally support the feeder housing on the forward portion of the combine 10. The yokes include locking mechanisms to hold the feeder housing in place which are not shown, but well known in the prior art. The rearward end of the body portion 60 extends partially into the inlet opening 40 of the combine to provide a more secure flow of crop material into the threshing and separating means. One of skill in the art will readily realize that either, or both, of the arms 64, 66 may include internal shafts which are driven externally to rotate the apron assembly (not shown). Importantly, the feeder housing of the instant invention further includes a pair of contact plates 70 and 72 which are, respectively, axially aligned with the arms 64, 66. The contact plates 70, 72 are at least semi-circular in nature, though they may be entirely circular with a common central axis with the arms 64, 66.

Figure 4:
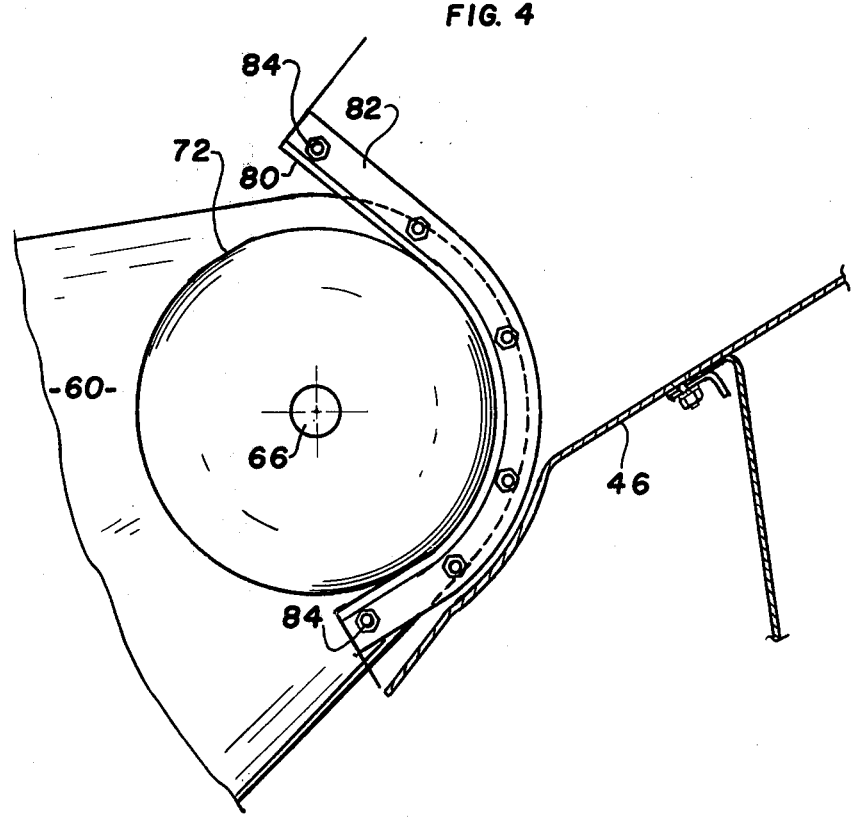
FIG. 4 is a partial schematic cross sectional view of the sealing means of the instant invention taken along lines 4—4 of FIG. 2, with a portion of a feeder housing added.

Referring now to FIG. 4, which is a schematic partial cross sectional view of FIG. 2, with the feeder housing in place, it can be seen that a sealing element 80 is supported between a bracket 81 (see FIG. 2) and a backup plate 82 so that a portion thereof is in a semi-circular configuration substantially matching that of contact plate 70. Element 80 comprises a resilient material such as, for example, masticated rubber or multi-ply belting reinforced with fabric. The rigid bracket 81 is constructed of a rigid material such as metal and is affixed to the main frame 12 by any suitable means, such as, for example, welding in the space between vertical edge 54 of inlet opening 40 and yoke 30, adjacent opening 40. A series of bolts, 84, are countersunk in bracket 81 and extend through element 80 and backup plate 82 to provide a conveniently replaceable structure with smooth internal surfaces.

In operation, as best understood with reference to FIGS. 2 and 4, the feeder housing 22 is pivotable about the axis of arms 64, 66. The fact that the contact plates and the resilient elements have at least partially a common central axis permits the elements to be in constant contact with the surface of the plates no matter what the angular relationship is between the feeder housing and the inlet opening. By providing similar devices on the two sides of the inlet opening, it is readily apparent that crop losses due to irregular fittings between the elements are reduced.

It will be understood that various other changes in the details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention.

For example, it may be found desirable under certain circumstances to permit limited vertical movement of yokes 30 and 32 to finely adjust the lateral attitude of the header relative to the combine main frame. This adjustment can be accomplished by providing vertical slots for bolts 56 and modifying transition surfaces, such as 46 in FIG. 4, to be vertically adjustable. Then, the sealing members on the combine, including upper and lower horizontal seals and transition surfaces, would need to be substantially unitized for the maintenance of proper elemental relationships during the adjustment procedure.

Having thus described the invention, what is claimed is:

1. In a crop threshing and separating machine having a mobile body, a forward crop inlet opening in the body, means for elevating crop material from the field to the inlet opening, and means for mounting the means for elevating to the body to maintain a crop material flow relationship between the means for elevating and the inlet opening while permitting selective vertical pivotal relative movement therebetween, the means for mounting including first and second yokes affixed to the body on respective opposing sides of the inlet opening a predetermined distance therefrom and first and second axially aligned arms affixed to the means for elevating in respective engagement with the first and second yokes, the improvement comprising:

first sealing means including first and second closure members affixed to the body between, respectively, said first and second yokes and said inlet opening, each said closure member comprising a resilient at least partly semi-circular element;

second sealing means including first and second smooth arcuate contact plates affixed to said means for elevating and having central axes corresponding to that of said arms, said contact plates each having a radius substantially equal to that of said semi-circular element, whereby said arms are engaged by said yokes to maintain said means for elevating in operative alignment with said inlet opening and said first and second sealing means engage each other to prevent crop material from escaping between said inlet opening and said means for elevating.

2. The machine of claim 1 wherein:

said means for elevating comprises a generally boxlike structure with first and second substantially open opposing ends, said first end extending at least partly into said inlet opening; and said first and second arms are affixed adjacent said first end, whereby said second end may be pivoted vertically while said means for elevating and said inlet opening are maintained in material flow communication.

3. The machine of claim 2 wherein:

said at least partly semi-circular elements comprise masticated rubber.

4. The machine of claim 2 wherein:

said at least partly semi-circular element comprise multi-ply belting reinforced fabric.

5. A threshing and separating machine comprising:
(a) a mobile frame adapted to move across a field;
(b) means mounted on said frame for threshing and separating grain from crop material;

(c) inlet means on said frame including a generally rectangular opening leading to said threshing and separating means;
(d) first coupling means including first and second yokes positioned, respectively, on said frame on opposing sides of said rectangular opening;
(e) first sealing means including first and second closure members affixed to said frame on respective sides of said rectangular opening between, respectively, said first and second yokes and said rectangular opening, each said closure member comprising a resilient at least partly semi-circular element;
(f) a crop material elevating means including a generally rectangular box-like housing with a top, a bottom, opposing sides, and open first and second opposing ends; and
(g) second sealing means including first and second smooth arcuate contact plates positioned adjacent said first end on the respective outsides of said opposing sides and having generally the same axis as said arms, each said arcuate contact plate having a contour corresponding to that of said semi-circular elements, whereby said arms are engaged by said yokes to maintain said elevating means in operative alignment with said inlet means and said first and second sealing means engage each other to prevent crop material from escaping between said inlet means and said crop material elevating means.

6. In a crop threshing and separating machine having a frame adapted to travel across a field, means mounted on the frame to thresh and separate grain from crop material, inlet means on the frame including an inlet opening with opposing sidewalls and guide means for directing material from the inlet toward the means to thresh and separate, means for elevating crop material from the field to the inlet means, and means pivotally mounting the means for elevating to the frame, the improvement wherein:
said means pivotally mounting said means for elevating including a pair of yokes, each affixed to said frame spaced from said opposing sidewall, respectively, and a pair of resilient sealing means affixed to said frame one between each sidewall and corresponding yoke, each sealing means being substantially semi-circular in configuration; and
said means for elevating is generally a multi-sided structure with open opposing first and second ends, said first end having means thereon to mate with and engage said yoke to support said means for elevating, and sealing surfaces on the exterior of said means for elevating matching the configuration of said sealing means, whereby said means for elevating may be vertically pivoted while maintaining a sealing contact between said sealing means and said sealing surfaces to prevent the escape of crop material being moved into said inlet means by said means for elevating.

* * * * *